Patented July 2, 1940

2,206,448

UNITED STATES PATENT OFFICE 2,206,448

SOFTENED RUBBER

Warren F. Busse, Akron, and Edward N. Cunningham, Cuyahoga Falls, Ohio, assignors to The B. F. Goodrich Company, New York, N. Y., a corporation of New York No Drawing. Application October 11, 1938, Serial No. 234,484

6 Claims. (Cl. 260—761)

This invention relates to the softening of rubber or to increasing its plasticity, and has as its object the preparation of a soft and plastic rubber directly from latex.

We have found that rubber may be softened and a highly plastic rubber may be prepared by treating latex with certain hydrazine compounds, preferably in the presence of certain oxygen carriers. After heating or after the lapse of sufficient time, the rubber will be found to be quite plastic and easily worked. The mastication which is ordinarily required before the rubber can be used, with its attendant heavy machinery and great expenditure of energy, can be entirely or partially omitted.

The compounds with which the latex is treated in this invention are those in which at least the two hydrogens on one nitrogen remain unsubstituted. The class of compounds which may be employed accordingly includes the parent compound, hydrazine, as well as derivatives in which one or two hydrocarbon radicals, or radicals which have essentially the properties of hydrocarbon radicals, such as ethyl, butyl, cyclohexyl, benzyl, phenyl, tolyl, xylyl, cumyl, xenyl, naphthyl, anthracyl, indanyl, chlorphenyl, nitrophenyl, alkoxy-phenyl, furyl, quinolyl and the like, occupy positions on a single one of the two nitrogens. Compounds in which the substituent radicals are not substantially hydrocarbon in nature, such as radicals which are strongly acidic or basic or which contain carbonyl groups, are substantially inactive and are excluded from this class of compounds. The preferred compounds are mono-aromatic substituted hydrazines such as phenylhydrazine and beta-naphthyl hydrazine. The free bases may be used, or it may be more convenient to add the compounds in the form of their salts with organic or inorganic acids or their molecular addition compounds with other materials such as zinc acetate, phenol, $SO_2$, etc., it being understood that the claims, unless otherwise limited, cover the use of the compounds either free or in the form of salts or addition complexes.

In practicing this invention one or more of the hydrazines of the class set forth above is added to the latex in small proportion, say from 0.01% to 1% or more of the rubber content of the latex, preferably as solutions or suspensions in water. If a salt of a hydrazine with a strong acid is employed, it should ordinarily be mixed with sufficient ammonia or other base to render it neutral or slightly alkaline to obviate any undesired tendency to coagulate the latex. On the other hand, if the latex is to be worked up immediately into solid rubber, either crude or compounded, such a salt may function as a coagulant in addition to its primary function of softening the rubber. The latex is also mixed with a substantially neutral per-oxygen compound, meaning a compound containing loosely bound oxygen capable of splitting off and oxidizing organic materials, such as hydrogen peroxide, per-salts such as sodium perborate, potassium permanganate, sodium chlorate, sodium perchlorate, ammonium persulfate, potassium chromate, potassium arsenate, sodium hypochlorite, potassium percarbonate, sodium nitrate, and the like, and organic peroxides such as acetyl peroxide, benzoyl peroxide, succinyl peroxide, and the like. Strongly alkaline peroxides such as $Na_2O_2$ or $BaO_2$ tend to stiffen the rubber rather than to soften it. The latex may be heated if desired to accelerate further the softening of the rubber.

As a specific example of one embodiment of the invention, one part by weight of phenylhydrazine hydrochloride is dissolved in 10 parts of concentrated aqueous ammonia and the solution is slowly added to 100 parts of approximately 60% concentrated latex. To one portion of this treated latex 5% by volume of 10% hydrogen peroxide is added. After standing for a day the latex was dried to recover its rubber. The rubber from the latex containing both the phenylhydrazine and the peroxide was quite tacky, soft and plastic, and that containing only the phenylhydrazine was somewhat tacky and more plastic than rubber from untreated latex, but not nearly as soft as that treated with both chemicals. Latex treated with hydrogen peroxide alone, on the other hand, was not noticeably affected, the rubber being tough, resilient, and practicaly non-tacky.

The latex may be treated as soon as it is collected, or at any later time, and may be employed for any purpose for which a soft, tacky rubber is desired, as an adhesive, as an impregnating or coating medium for fibrous materials, and the like, or may be worked up into solid rubber, either in its final shape or in the form of crude rubber, either immediately after treatment or at any desired later time. The proportion of hydrazine compound added and the length of time between the treatment and the final use of the latex or the rubber derived therefrom will be chosen in accordance with the particular degree of softness desired. If at any time a lot of latex or rubber is permitted to become too soft it may be blended with untreated latex or rubber to restore the desired properties.

This application is a continuation-in-part of our copending application Serial No. 54,059, filed December 12, 1935.

We claim:

1. The process of producing a softened rubber which comprises treating rubber latex with a hydrazine in which at least the two hydrogens on one nitrogen remain unsubstituted, and in which all substituents are hydrocarbon radicals, in the presence of a substantially neutral per-oxygen compound.

2. The process of producing a softened rubber which comprises treating rubber latex with a hydrazine in which at least the two hydrogens on one nitrogen remain unsubstituted, and in which all substituents are hydrocarbon radicals, in the presence of hydrogen peroxide.

3. The process of producing a softened rubber which comprises treating rubber latex with a mono-aryl substituted hydrazine in the presence of hydrogen peroxide.

4. The process of producing a softened rubber which comprises treating rubber latex with phenylhydrazine in the presence of hydrogen peroxide.

5. The process of producing a softened rubber which comprises treating rubber latex with a mono-aryl substituted hydrazine in the presence of a substantially neutral per-oxygen compound.

6. The process of producing a softened rubber which comprises treating rubber latex with phenyl hydrazine in the presence of a substantially neutral per-oxygen compound.

WARREN F. BUSSE.
EDWARD N. CUNNINGHAM.